United States Patent
Date et al.

[11] 3,890,942
[45] June 24, 1975

[54] REDUCTION OF NO$_x$, HC, AND CO IN THE EXHAUST GASES OF INTERNAL COMBUSTION ENGINES

[75] Inventors: Tasuku Date, Tokyo; Shizuo Yagi, both of Japan

[73] Assignee: Honda Giken Kogyo Kabushiki Kaisha, Tokyo, Japan

[22] Filed: Apr. 23, 1973

[21] Appl. No.: 353,786

Related U.S. Application Data

[63] Continuation-in-part of Ser. No. 291,254, Sept. 22, 1972, abandoned.

[30] Foreign Application Priority Data

Jan. 11, 1972 Japan................................ 47-4973
Mar. 6, 1972 Japan................................ 47-22210

[52] U.S. Cl...... 123/75 B; 123/32 SP; 123/122 AB; 123/191 SP; 123/32 AA
[51] Int. Cl..................... F02b 19/10; F02b 19/18
[58] Field of Search......... 123/32 ST, 32 SP, 32 SA, 123/32 R, 127, 75 B, 191 S, 191 SP

[56] References Cited
UNITED STATES PATENTS

| | | | |
|---|---|---|---|
| 1,616,157 | 2/1927 | Werner | 123/32 ST |
| 2,065,419 | 12/1936 | Bagnulo | 123/32 ST |
| 2,673,554 | 3/1954 | Thaheld | 123/32 ST |
| 3,364,911 | 1/1968 | Baudry | 123/32 ST |
| 3,508,530 | 4/1970 | Clawson | 123/32 ST |
| 3,633,553 | 1/1972 | Holzapfel | 123/32 ST |
| R19,742 | 10/1935 | Treiber | 123/32 ST |

OTHER PUBLICATIONS

"On Torch Ignition in Light Engines," by Yu V. Sviridov; B. A. Zuyers, Trans. Engine Lab., Academy of Sciences, USSR, No. 4, 1958, pp. 108–123.
"Carburation," Vol. 2, by C. H. Fisher, 4th Edition, Chapman; Hall, 1966, pp. 188–212.

*Primary Examiner*—Manuel A. Antonakas
*Assistant Examiner*—Ronald B. Cox
*Attorney, Agent, or Firm*—Lyon & Lyon

[57] ABSTRACT

A four-cycle spark-ignition internal combustion piston engine operates with a low peak temperature to reduce NO$_x$, a very slow combustion rate and a high prolonged combustion temperature extending for at least 180° of crank angle, to reduce HC. CO is minimized by means of a lean overall air-fuel ratio. A rich mixture from a first carburetor throat supplies an auxiliary combustion chamber through a valve, and a lean mixture from a second carburetor throat supplies the main combustion chamber through a valve. A torch nozzle restriction connects the chambers. A mixture cloud of relatively rich combustible mixture is formed in the minimum-turbulence main chamber adjacent the torch nozzle restriction at the time of ignition. The carburetor throttle valves are interconnected for dependent action to change the relative amounts of air-fuel mixture admitted to each chamber as the engine load varies from idling to full throttle. The volume of the auxiliary chamber is from 5% to 12% of the total combined volumes of the main chamber and the auxiliary chamber. The cross sectional area of the torch nozzle restriction is from 0.04 square centimeter to 0.16 square centimeter for each cubic centimeter of volume of the auxiliary chamber. The cross sectional area of the torch nozzle restriction is greater than that of the venturi passage in the first carburetor supplying the rich mixture. The rich mixture is passed in heat exchange relationship with the hot exhaust gases in order to prevent condensation. A thin wall metal cup is positioned within the auxiliary chamber cavity and isolated from the engine walls so that it remains hot and prevents condensation of fuel from the rich mixture. The spark plug electrodes are positioned outside the hot cup and out of the path of the rich mixture passing from the intake valve into the auxiliary chamber, and the electrodes are also placed out of a "line of sight" position with respect to the axis of the torch nozzle restriction and aperture in the cup.

27 Claims, 22 Drawing Figures

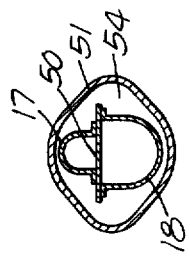
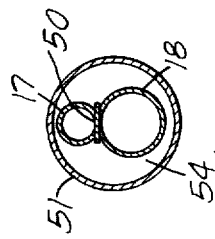
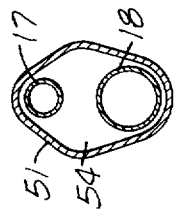
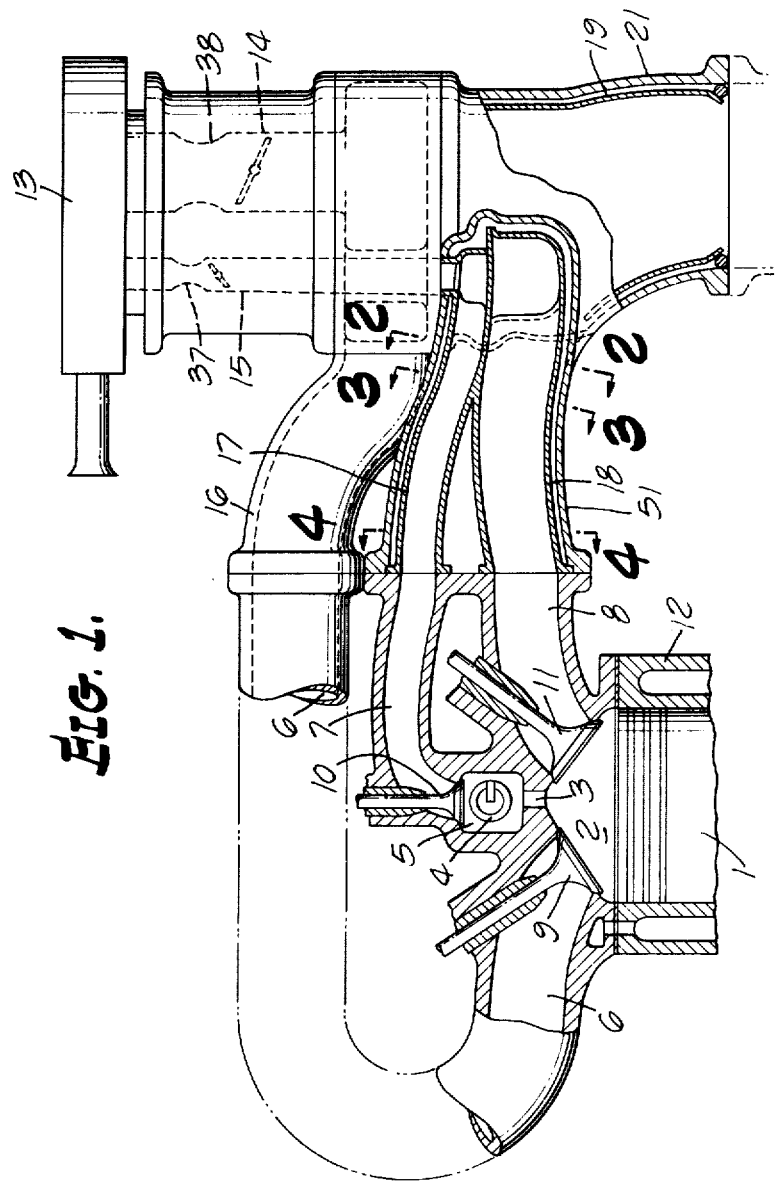

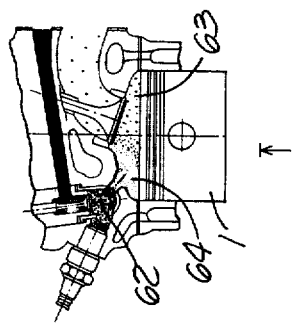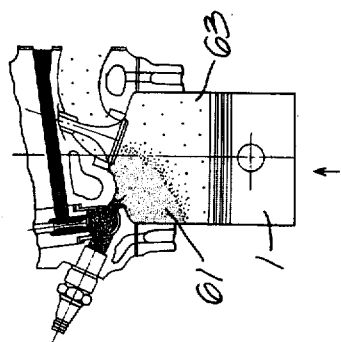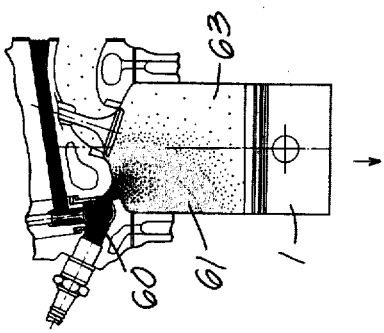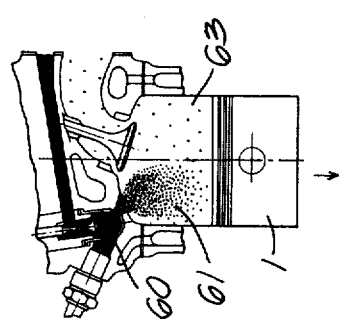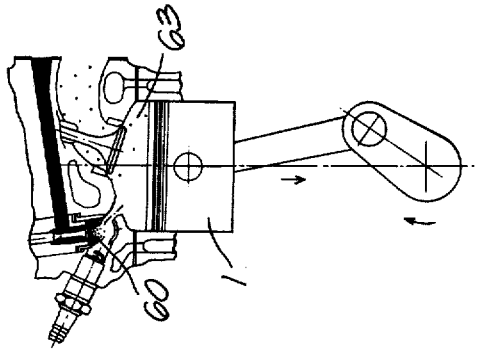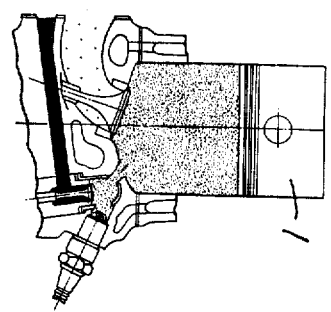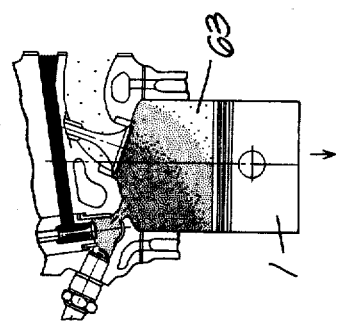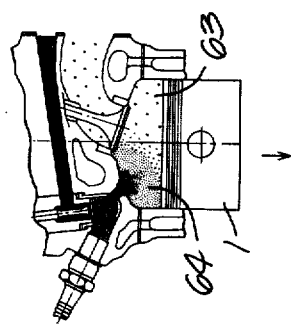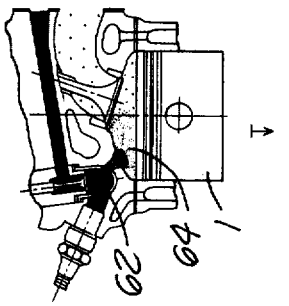

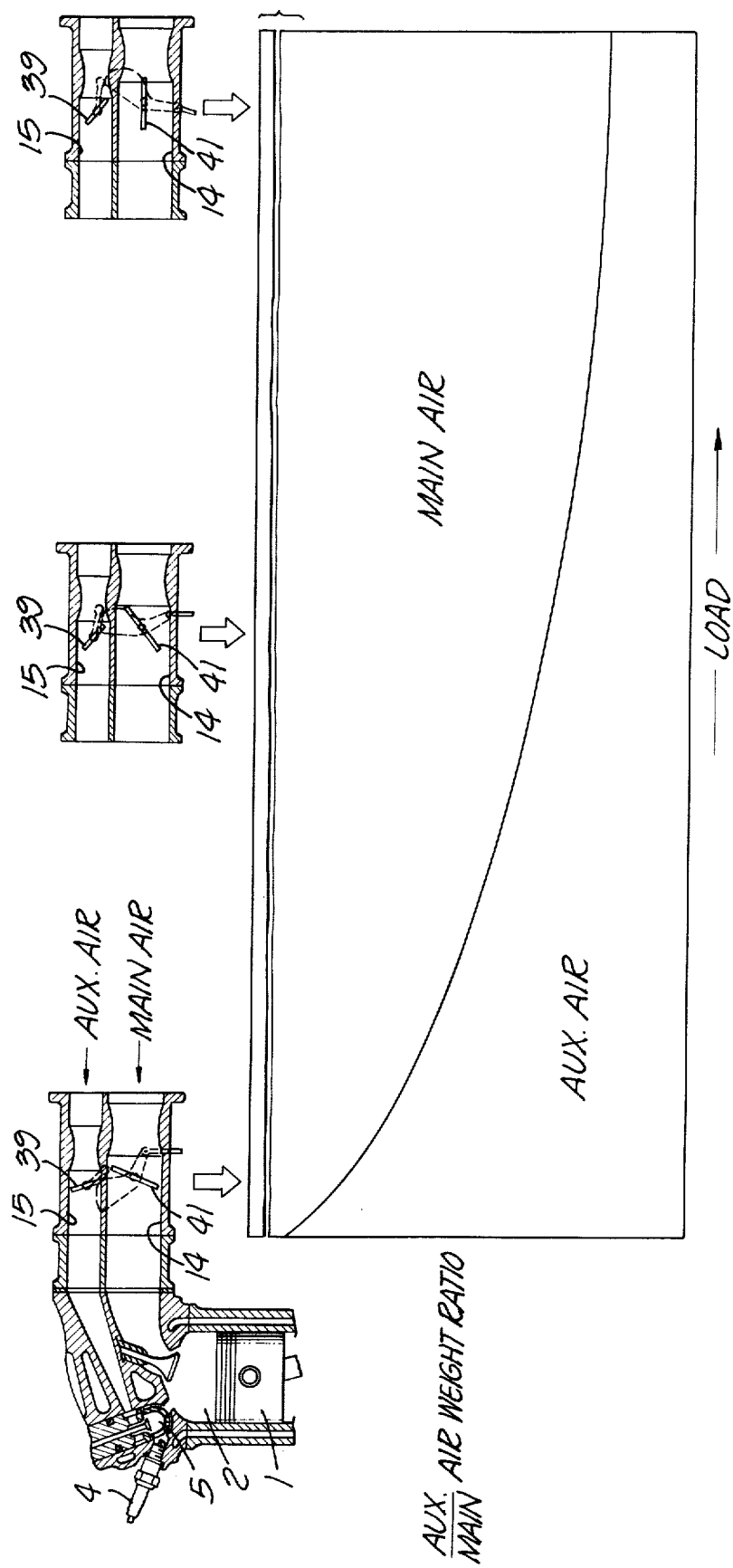

REDUCTION OF $NO_x$, HC, AND CO IN THE EXHAUST GASES OF INTERNAL COMBUSTION ENGINES

This application is a continuation-in-part of our co-pending application Ser. No. 291,254 filed Sept. 22, 1972, now abandoned.

This invention relates to four-cycle internal combustion piston engines and is particularly directed to simultaneous reduction of oxides of nitrogen ($NO_x$), unburned hydrocarbons (HC), and carbon monoxide (CO) in the exhaust gases from such engines.

In accordance with this invention, these three undesirable constituents in the exhaust gases are minimized by improvements in the basic combustion process of the engine. Minimizing the production of $NO_x$ is accomplished by lowering the peak combustion temperature. The combustion temperature on the other hand, is maintained at a high level for a long duration to minimize the emission of HC. CO emissions are minimized by providing excess oxygen in the combustible mixture.

With regard to minimizing production of $NO_x$, the maximum combustion temperature is controlled under most operating conditions so as not to exceed about 1,200° C in the main chamber. This is to be compared to a maximum combustion temperature in conventional four-cycle gasoline engines which can exceed 2,000° C under relatively heavy load conditions.

With regard to minimizing the emissions of HC, it is generally known that the combustible mixture adjacent the relatively low-temperature cylinder walls does not burn completely even when a conventional engine is operated under the best of conditions. The oxidation of HC is actively promoted when the combustion temperature exceeds about 800° C. The combustion temperature in a conventional four-cycle gasoline engine rapidly reaches a high value after the ignition of the mixture, and rapidly lowers as the combustion gases expand. Consequently, the temperature at which burning of HC actively occurs is of very short duration, resulting in exhausting of unburned hydrocarbons (HC) from the vicinity of the cylinder walls. Therefore, in order to minimize HC emissions in accordance with this invention, the combustion temperature in the cylinder is maintained at a relatively high value and for as long as duration as possible.

It is generally known that CO emissions are minimized when the combustible mixture is leaner than the stoichiometric air-fuel ratio. Such a lean mixture, however, is very poor in ignitability, resulting in unstable engine operation; and in an extreme case, the mixture inducted into a cylinder may be exhausted without combustion. Therefore, in order to minimize CO emissions, it is necessary to improve the combustion process so that the engine may operate in a stable fashion with a very lean combustible mixture.

$NO_x$ emissions are greatest when the engine is operating under heavy load conditions, and HC emissions are greatest when the engine is idling or operating under light load conditions.

The foregoing time and temperature requirements to achieve minimum emissions of $NO_x$, HC and CO require an extremely slow combustion rate of the lean air-fuel combustible mixture. Also, a very strong ignition source such as a torch must be provided in order to burn the extremely lean combustible mixture. Furthermore, the flame propagation velocity must be regulated in accordance with the load on the engine to obtain the desired combustion temperature.

Prior art internal combustion engines have been proposed which would seek to minimize the production of unburned hydrocarbons in the exhaust gases of the engine by raising the combustion temperature and pressure within the main chamber and using an ignition source designed to complete the combustion within 10 or 15 degrees of crank angle after top dead center position of the piston. Such proposed engines may minimize the production of HC but only at the expense of producing a greater quantity of $NO_x$. Such prior art engines have been unable to minimize production of both $NO_x$ and HC because of the apparently conflicting combustion temperature requirements. This invention solves the dilemma by minimizing the peak temperature, which is responsible for the production of $NO_x$, while at the same time maintaining a relatively high temperature for a relatively long time period during the entire power stroke of the piston, corresponding to at least 180° of crank angle.

This invention involves the use of a four-cycle spark-ignition internal combustion reciprocating piston engine employing a main combustion chamber and an auxiliary combustion chamber (or prechamber), the chambers being connected by a torch nozzle restriction. Means, such as a first throat in a carburetor, supply a rich air-fuel mixture to the valved intake passage to the auxiliary chamber, and additional means such as a second throat in the carburetor supply a lean air-fuel mixture to the valved inlet passage for the main chamber. Separate throttles in the two carburetor throats are effective to vary the quantity of the mixture supplied to each of the chambers. The valved passages to the two chambers are opened and closed in predetermined sequence so that during the suction stroke of the piston a lean mixture is drawn into the main chamber and a rich mixture is drawn into and through the auxiliary chamber and torch nozzle restriction into the main chamber. This rich mixture entering the lean mixture within the main combustion chamber diffuses to form a localized zone comprising a mixture of moderate richness in the main chamber near the torch nozzle restriction. The subsequent compression stroke of the piston causes reverse movement of a portion of that moderate mixture zone from the main chamber back through the torch nozzle restriction and into the auxiliary chamber. With the piston at or near top dead center at the end of the compression stroke, the air-fuel mixture in the auxiliary chamber is still rich but its richness has been weakened to some extent during the reverse travel of a portion of the moderate mixture zone back into the auxiliary chamber. At the same time the remaining portion of the moderate mixture zone under compression in the main chamber and near the torch nozzle restriction remains in position and is richer than the relatively lean compressed air-fuel mixture in the balance of the main chamber. The remaining portion of the moderate mixture zone under compression in the main chamber is designated a "mixture cloud".

Ignition of the compressed air-fuel mixture in the auxiliary chamber is accomplished by firing of a spark plug having its electrodes communicating with the auxiliary chamber. The relatively rich mixture ignites almost immediately and projects a torch flame through the torch nozzle restriction to ignite the mixture cloud in the main combustion chamber. The proportions of the structural parts and the richness of the mixture cloud produce a low peak temperature and a slow burning of the lean mixture throughout the power stroke of the piston and extending for at least 180 degrees of crank angle. The relatively high prolonged temperature, although without a high peak, minimizes production of unburned hydrocarbons in the exhaust gases, and oxidizes most of the carbon monoxide to carbon dioxide because of the excess oxygen in the main combustion chamber.

In order to achieve the low peak temperature for reduction of $NO_x$ and the high prolonged temperature for reduction of HC in the exhaust gases, the mixture cloud must be formed of the proper size, the ratio of the volumes of the two chambers must be maintained within predetermined limits, and the cross sectional area of the torch nozzle restriction must be proportional to the size of the auxiliary chamber within predetermined limits. Moreover, the ratio $$\lambda = \frac{\text{air weight inducted into auxiliary chamber}}{\text{air weight inducted into main chamber}}$$

is controlled by separate carburetors each supplying one of the chambers. The carburetors are linked together with a cam action for regulating the relative positions of their throttle valves from idling through full throttle engine loading. $\lambda$ is made larger at idling and smaller at full load. Thus, at idling, a large mixture cloud is needed because a large amount of residual gases relative to the fresh charge makes it difficult to burn, resulting in large HC emissions while $NO_x$ emissions are small. At full load, the mixture cloud must be made small to reduce peak temperature and, thus, $NO_x$. Also, in order to form a mixture cloud of the required air-fuel ratio in the main combustion chamber, $\alpha_n$ (air-fuel ratio of the mixture delivered to the auxiliary combustion chamber) and $\alpha_m$ (air-fuel ratio of the mixture delivered to the main combustion chamber) must be regulated in relation to the fresh air flow rate of the auxiliary and main combustion chambers.

Other features of this invention include:

The rich air-fuel mixture to be introduced into the auxiliary combustion chamber is first heated by passing it in heat exchange relationship with the hot exhaust gases issuing from the main combustion chamber, and in this way substantially all of the fuel in the rich mixture is vaporized prior to its admission into the auxiliary combustion chamber.

Turbulence is minimized in the main chamber so as not to disperse the mixture cloud and in order to prolong the time of combustion, and the minimum-turbulence condition is promoted by the minimizing of any "squish" regions. That is, the dome portion of the main chamber formed above the cylinder has the same circular shape and size as the cylinder, without substantial discontinuities.

The spark plug is placed so that its electrodes are not fouled by impingement of rich mixture as it is introduced into the auxiliary chamber, and so that the spark at the electrodes is not blown out by flow of gas from the main chamber near the end of the compression stroke.

The cross sectional area of the torch nozzle restriction is made larger than the cross sectional area of the venturi in the carburetor supplying the rich mixture to the auxiliary combustion chamber in order to insure accurate regulation of the air flow at or near the full throttle througout the life span of the engine.

The main combustion chamber formed between the engine head and the piston at top dead center is not symmetrical, and instead has greater depth at one side of the center line and communicates with the torch nozzle restriction near the region of greatest depth.

The torch is directed toward the axis of the cylinder and just below the head of the piston in top dead center (TDC) position.

Other objects and advantages will appear hereinafter.

In the drawings:

FIG. 1 is a side elevation in diagrammatic form and partly in cross section showing a preferred embodiment of this invention.

FIGS. 2, 3 and 4 are transverse sectional details taken substantially on the lines 2—2, 3—3 and 4—4, respectively, as shown in FIG. 1.

FIGS. 11–19 are schematic diagrams showing the sequence of steps during the suction, compression and power strokes which produce the mixture cloud, and showing how this mixture cloud promotes slow combustion.

FIG. 22 is a diagram illustrating how increasing engine load affects the relative weights of air delivered to the main chamber and the auxiliary chamber.

Figure 5:
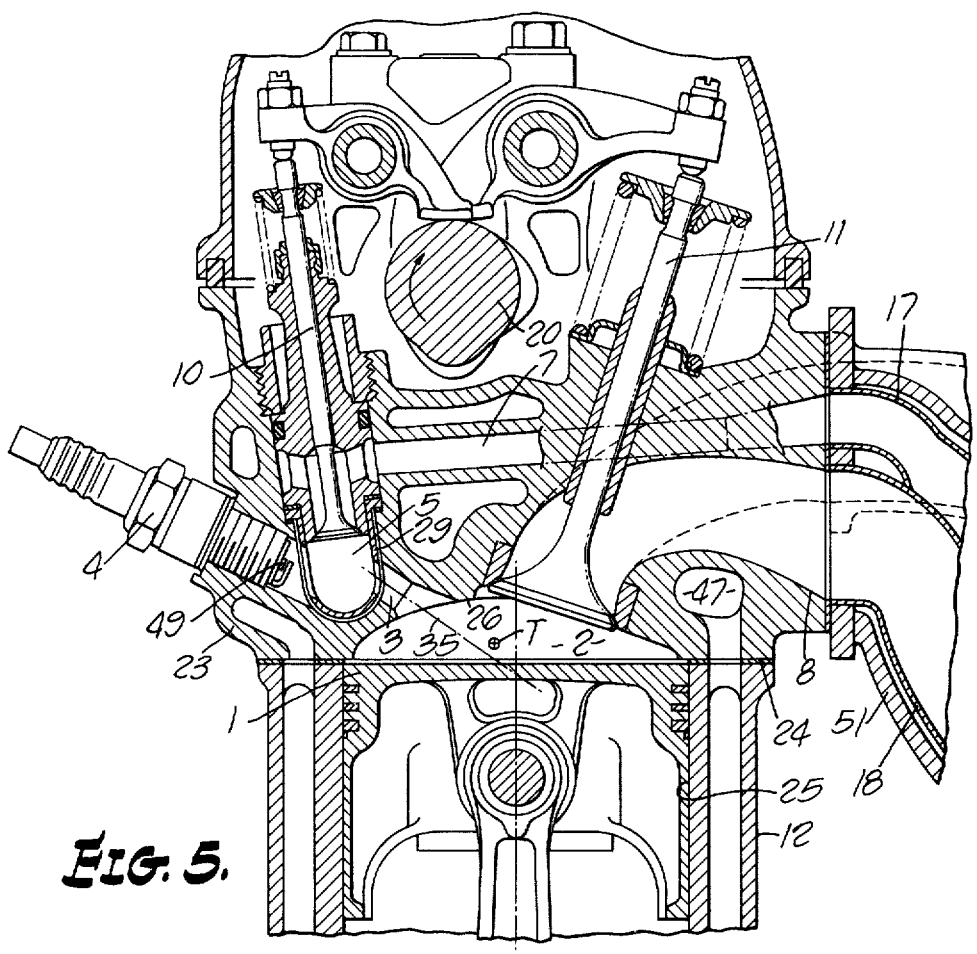
FIG. 5 is a transverse sectional view taken substantially on lines 5—5 as shown on FIG. 9, and showing construction features of a preferred form of four-cycle internal combustion engine embodying this invention.

Referring to the drawings, the internal combustion engine has a piston 1 defining a movable wall of the main combustion chamber 2. A torch nozzle restriction 3 extends between the main combustion chamber 2 and the auxiliary combustion chamber 5, the latter being provided with a spark plug 4. The intake passage 6 to the main chamber 2 is controlled by intake valve 9, and the intake passage 7 to the auxiliary chamber 5 is controlled by intake valve 10. The exhaust passage 8 from the main combustion chamber 2 is controlled by exhaust valve 11. The three valves 9, 10 and 11 are mounted in the engine head, and operated by conventional means, including the cam shaft 20.

Air admitted through air cleaner 13 is mixed with fuel in the main carburetor 14 and in the auxiliary carburetor 15, and the mixtures thus formed pass through the main intake manifold 16 and the auxiliary intake pipe 17, respectively. A relatively rich mixture is delivered from carburetor 15 to intake pipe 17. The spark plug 4 ignites the relatively rich mixture in the auxiliary chamber 5 and causes a torch flame to project through the restriction 3 to ignite the relatively lean mixture in the main chamber 2. The exhaust gases from the main chamber 2 pass through the exhaust passage 8 and exhaust liner 18, and serve to heat the rich mixture in the pipe 17 to avoid condensation of fuel on the walls of the passage 7 and auxiliary chamber 5. The exhaust gases from the liner 18 pass out through the liner 19 within the exhaust manifold 21.

The parts forming the main combustion chamber 2, torch nozzle restriction 3 and auxiliary combustion chamber 5 are shown diagrammatically in FIG. 1, and an actual embodiment of these parts is shown in FIG. 5 (the main intake valve 9 is omitted from FIG. 5 for clarity of illustration).

The engine head 23 is secured to the engine block 12 by conventional means, not shown, and the usual gasket 24 may be clamped therebetween. The main combustion chamber 2 is formed between the top of the piston 1 and the curved surface 26 which defines a recess in th engine head 23, confronting the top of the piston. Portions of this main combustion chamber 2 are formed by the heads of the intake valve 9 and the exhaust valve 11. The recess in the engine head is not symmetrical but has the greatest depth in the region of the torch nozzle restriction 3. The recess has a circular boundary coincident with and substantially the same size as the cylinder bore 25, to eliminate "squish" and minimize turbulence in the main chamber 2 at the end of the compression stroke of the piston.

The auxiliary combustion chamber 5 is defined within the thin wall cup 29 and the spark plug recess 28. The clearance space 48 between the cup 29 and the curved walls 27 in the engine head 23 is so small as to have a negligible effect on the volume. The head of the valve 10 forms one wall of the auxiliary chamber 5. The cup is held in place by means of a terminal flange 30 clamped between heat insulating elements 31 and 32. The thin wall cup 29 has a first aperture 36 aligned with the torch nozzle restriction 3 and a second aperture 34 which communicates with the spark plug recess 28.

As shown in FIGS. 11, 12 and 13, the suction stroke of the piston 1 draws rich mixture into the auxiliary chamber 5 and, through the torch nozzle restriction 3, into the main chamber 2. The amount of rich mixture inducted in this manner is limited by the throttling action of the throttle valve 39 in the auxiliary carburetor 15. This rich mixture 60 enters into the lean mixture 63 supplied from the inlet passage 6. This dispersion of the rich mixture 60 into the lean mixture 63 forms a localized region 61 comprising a mixture of moderate richness. This diffusing action of rich mixture into the lean mixture continues throughout the suction stroke. FIG. 13 shows the piston approaching bottom dead center position. This localized region 61 comprising a mixture of moderate richness is richer than the lean mixture 63 but not as rich as the mixture 60 inducted into the auxiliary chamber 5.

During the compression stroke of the piston, as shown in FIGS. 14 and 15, a portion of the moderate mixture 61 near the torch nozzle restriction 3 flows back through the torch nozzle restriction 3 and into the auxiliary chamber 5. As a result, the mixture in the auxiliary chamber becomes leaner compared to the original richness. When the piston 1 approaches top dead center immediately before ignition, as shown in FIG. 15, the following mixtures exist in the chambers;

a. A relatively rich mixture 62 in the auxiliary chamber 5 near the spark plug electrodes;
b. A lean mixture 63 in the major portion of the main chamber 2; and
c. A localized region 64 of intermediate mixture gradient, referred to as a mixture cloud.

The ignition produced by a spark between the spark plug electrodes ignites the rich mixture 62 in the auxiliary chamber 5 when the piston 1 is near top dead center. The burning flame passes through the torch nozzle restriction 3 into the quiescent mixtures in the main chamber 2. This is shown in FIG. 16. As shown in FIG. 17, the mixture cloud 64 continues to burn as the piston 1 moves downward during the power stroke. Burning of the mixture cloud 64 causes slow burning of the lean mixture 63. The slow burning continued throughout the power stroke, as shown in FIGS. 18 and 19. The slow burning, lasting throughout the power stroke and beyond, has two very important effects: first, it minimizes the peak combustion temperature so that it does not exceed about 1,200° C in the main chamber, under most operating conditions, and second, it maintains a relatively high combustion temperature throughout the power stroke and at least a part of the exhaust stroke. The relatively low peak temperature minimizes the production of $NO_x$, and the relatively long burning period at prolonged high temperature above about 800°C minimizes the production of HC.

The volume of the auxiliary combustion chamber 5 bears an important relation to the volume of the main combustion chamber when the piston 1 is at top dead center position. If the volume of the auxiliary combustion chamber 5 is too large as compared to the volume of the main combustion chamber 2, an efficient combustion of lean mixture in the main combustion chamber cannot be expected since the amount of mixture cloud 64 formed at the end of the compression stroke will be small, in order to maintain the lean overall air-fuel ratio; also, the torch energy will become too large, resulting in quick combustion, higher peak temperature and larger $NO_x$ emissions. If, on the other hand, the auxiliary combustion chamber 5 is too small with respect to the volume of the main combustion chamber 2, the torch energy through the torch nozzle restriction 3 becomes so weak that the lean mixture 63 within the main combustion chamber 2 does not burn to completion. It has been found that the volume of the auxiliary chamber 5 should be from 5% to 12% of the total combined volume of the auxiliary chamber 5 and the main chamber 2, with the piston in top dead center position.

Also, if the torch nozzle restriction 3 communicating between the auxiliary combustion chamber 5 and the main combustion chamber 2 is too large in cross sectional area, the blow velocity of the mixture passing through the torch nozzle restriction 3 is decreased on the suction stroke, and as a result the rich mixture dispersion becomes smaller, and though the mixture cloud 64 becomes relatively richer its size will be too small to produce an effective combustion of the lean mixture 63 in the main combustion chamber 2. On the other hand, if the torch nozzle restriction 3 is too small in cross sectional area, the blow velocity of the mixture passing through the torch nozzle restriction becomes so great that the degree of the mixture dispersion will become extensive and result in failure to form an efficient mixture cloud enough to properly propagate combustion. It has been found that best results are obtained when the cross sectional area of the torch nozzle restriction 3 is from 0.04 square centimeter to 0.16 square centimeter per one cubic centimeter of volume of the auxiliary combustion chamber.

Complete burning of the lean air-fuel mixture in the main combustion chamber 2 is necessary to minimize HC and CO in the exhaust gases, and this characteristic of complete burning is promoted by proper positioning of the torch nozzle restriction 3. It has been found that good results are obtained when the torch flame axis 35 passes through the center of the top surface of the piston, or just below it when the piston is in top dead center position. The restriction 3 is placed so that the torch flame axis 35 extends symmetrically from the central axis of the hot cup 29 toward the common axis of the piston 1 and cylinder 25 and inclined with respect thereto.

Figure 7:
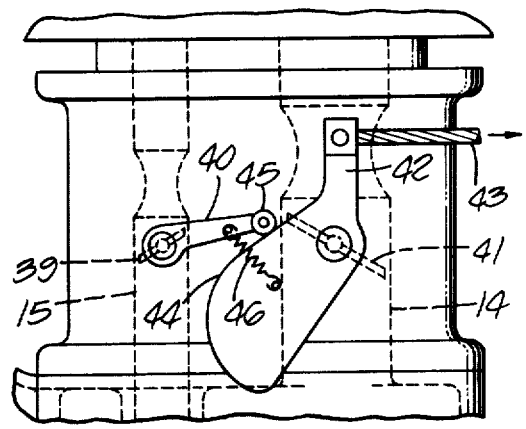
FIG. 7 is a side elevation showing a portion of FIG. 1 on an enlarged scale and illustrating a cam linkage for connecting the throttle valves of two carburetors, one carburetor supplying the rich mixture to the auxiliary combustion chamber and the other carburetor supplying the lean mixture to the main combustion chamber.

The ratio $$\lambda = \frac{\text{air weight inducted into auxiliary chamber}}{\text{air weight inducted into main chamber}}$$

is controlled by carburetors 15 and 14 linked together in a fashion to produce the desired air weight ratio for each operating condition from idle through full throttle loading of the engine. This ratio varies considerably from idle position to full throttle position. As shown in FIG. 7, the carburetor 15 is provided with a throttle valve 39 operated by arm 40. Similarly, carburetor 14 is provided with a throttle valve 41 operated by arm 42 from cable 43. The arm 42 is provided with a cam surface 44 which is engaged by the cam follower roller 45 mounted on the arm 40. A spring 46 holds the roller 45 in contact with the cam surface 44. The ratio of the degree of opening of the auxiliary throttle valve 39 as compared to the opening of the main throttle valve 41 is governed by the configuration of the surface of the cam 44. In the illustrated embodiment, the angular movements of the main throttle valve 41 and auxiliary throttle valve 39 are similar during the initial opening stages. However, as the opening of the main throttle valve 41 increases, the rate of increase in opening of the auxiliary throttle valve 39 is reduced. (See FIG. 22.)

In the operation of the engine, and specifically its suction stroke, a lean mixture is drawn into the main combustion chamber from carburetor 14 through intake valve 9, and at the same time a rich mixture is drawn into the auxiliary combustion chamber 5 from the carburetor 15 through auxiliary intake valve 10. As pointed out above, the air-fuel ratio of the combustible mixture in the auxiliary chamber 5 at the time of ignition is leaner than that previously provided from the carburetor 15. On the other hand, the air-fuel ratio of the mixture cloud 64 remaining in the main combustion chamber 2 at the time of combustion is richer than that of the lean mixture 63 delivered from the main carburetor 14. The degree of such change in air-fuel ratio in the main and auxiliary combustion chambers is determined by the amounts of lean and rich mixtures drawn into the two respective combustion chambers. Thus, in order to operate the internal combustion engine with a mixture of desired overall air-fuel ratio, at all times, it is necessary to vary the value of opening ratio between the main and auxiliary throttle valves 41 and 39 to change the amount of mixture charged into the main and auxiliary combustion chambers for different throttle openings. (See FIG. 22.)

It will thus be understood that the opening ratio between the main and auxiliary throttle valves 41 and 39 in their partial opening ranges can be held substantially constant to produce a large mixture cloud in the main combustion chamber 2, thereby to obtain complete combustion of the hard-to-ignite lean mixture, which contains residual gases in such opening ranges. In the wider opening ranges of the main and auxiliary throttle valves, an increase in opening of the auxiliary throttle valve 39 is reduced relative to that of the main throttle 41 to insure complete combustion and low peak temperature which produces minimum HC and $NO_x$.

It is desired that the rate of combustion in the main chamber 2 be exceptionally slow and therefore it is necessary to eliminate excessive turbulence to prevent the mixture cloud from being dispersed. For this reason the cavity in the engine head defined by the wall 26 has a maximum diameter which is practically the same as the diameter of the cylinder bore 25. Thus, when the piston reaches top dead center there is a minimum "squish" area from which gas must be violently expelled toward the end of the compression stroke. The main combustion chamber is designed and proportioned to produce minimum turbulence, and this minimum squish feature is of importance in this regard. Moreover, the torch nozzle restriction 3 is placed so that the rich mixture inducted through it into the main chamber 2 is not thoroughly mixed with the lean mixture inducted through the intake valve 9.

The thin wall cup 29 is U shaped in cross section and is preferably formed of heat resistant material such as stainless steel. It is preferably about two millimeters thick. Except for the spark plug recess 28, the thin wall cup 29 essentially defines the outer boundary of the auxiliary combustion chamber 5. The cup 29 is constructed and mounted so that it remains hot during operation of the engine since, for most of its length, the cup does not contact the walls of the engine head 23 which is cooled by water passages 47. If desired, the space 48 between the thin wall cup 29 and the encircling walls 27 of the engine head may be filled with any suitable heat insulating material. However, good results have been obtained when this space is left empty. The thin wall cup is small in heat capacity and is thermally insulated from the engine walls so that when the engine is started up the thin wall cup is immediately heated and is thereafter kept at a relatively high temperature during the engine operation. The hot cup prevents condensation of fuel admitted by valve 10 into the auxiliary combustion chamber 5, and thereby helps reduce HC emissions under cold starting conditions.

The exhaust gas, in comparison with a conventional engine, is ordinarily higher in temperature and contains excess oxygen, so that oxidation reactions continue to take place within the exhaust system. Also, in order to more completely vaporize the intake mixture than is the case with conventional engines, the auxiliary intake passage leading to the valve 10 is maintained at a higher temperature. Immediately after the engine starts, the exhaust manifold heats up and this heat is used to improve the mixture quality supplied to the auxiliary combustion chamber 5. In order to maintain the temperature of the rich mixture between 140° and 350° C at the time it reaches the auxiliary combustion chamber 5, the rich mixture is passed in heat exchange relationship with exhaust gases. The temperature should not exceed 350° C in order to prevent pre-ignition. It is advantageous to construct the exhaust manifold and intake manifold for the auxiliary chamber 5 in a unit construction to make them as thin as possible for maximum heat transfer, particularly under cold starting conditions. Also, it is desirable to keep the exhaust passages hot at all times to minimize HC emissions. However, since the exhaust manifold heats up to about 800° C during engine operation, its strength decreases and it might be subject to mechanical damage. Furthermore, the radiation heat and transferred heat up to the carburetors tends to boil the fuel within the carburetors with resultant faulty operation.

As best shown in FIGS. 1–4, the rich intake pipe 17 and the exhaust pipe 18 have a common wall 50 formed of relatively thin metal to promote heat transfer. The common wall 50 is formed by the merger of portions of the conduits 17 and 18, as shown in FIGS. 2 and 3. A relatively thick wall housing 51 encloses the thin wall heat transfer conduits 17 and 18 and this housing is secured by conventional means to that portion of the engine head 23 which is provided with the intake and exhaust conduits. This housing protects the hot thin-wall heat-transfer liner 18 from destructive vibrations of engine and vehicle, and minimizes transfer of heat to the carburetors.

The position of the spark plug 4 is chosen so that its electrodes 49 are positioned out of the hot cup 29 and out of the path of the rich mixture entering the interior of the cup 29 between the valve 10 and its stationary seat. In this way, the electrodes 49 are protected from contact by any droplets of fuel which may be contained in the rich mixture. The spark plug electrodes are also located so that there is no direct "line of sight" path through the torch nozzle restriction 3 and the cup apertures 36 and 34 to the electrodes. In this way, the rapid flow which occurs from the main chamber 2 to the auxiliary chamber 5 during the compression stroke of the piston 1 does not set up such a strong blast of gas that might cause a misfire by blowout of the spark between the electrodes 49. The axis 35 of the torch nozzle restriction 3 is directed toward the upper part of the auxiliary combustion chamber 5, while the aperture 34 communicating with the spark plug recess 28 is off to one side of that axis. Accordingly, the spark plug 4 generates its spark without danger of blowout. The lower rounded portion of the cup 29 forms a pocket 67 to collect any unvaporized fuel droplets in a pool. Such liquid droplets may accumulate under start-up conditions before the engine is warm, and the droplets are thus prevented from entering the main chamber 2 to increase HC emissions as a result of incomplete combustion.

It is important that the cross sectional area of the torch nozzle restriction 3 be greater than the cross sectional area of the venturi throat 37 in the carburetor 15 for the auxiliary combustion chamber 5. When the engine is operating at or near full load, the amount of rich mixture delivered to the auxiliary combustion chamber 5 should be determined by the size of the venturi 37, and similarly, the amount of lean mixture delivered to the main combustion chamber 2 should be determined by the size of the venturi 38. The internal walls of the torch nozzle restriction 3 are subject to buildup of impurities including carbon, after a period of use. Reduction of the size of the torch nozzle restriction 3 by buildup of impurities including carbon would impose a restriction on the amount of rich mixture which could reach the auxiliary combustion chamber 5. This restriction would in turn upset the proper balance between the rich mixture supplied by carburetor 15 and the lean mixture supplied by carburetor 14. Accordingly, the cross sectional area of the venturi 37 in the carburetor 15 is made smaller than the cross sectional area of the cross sectional area of the torch nozzle restriction 3.

Figure 8:
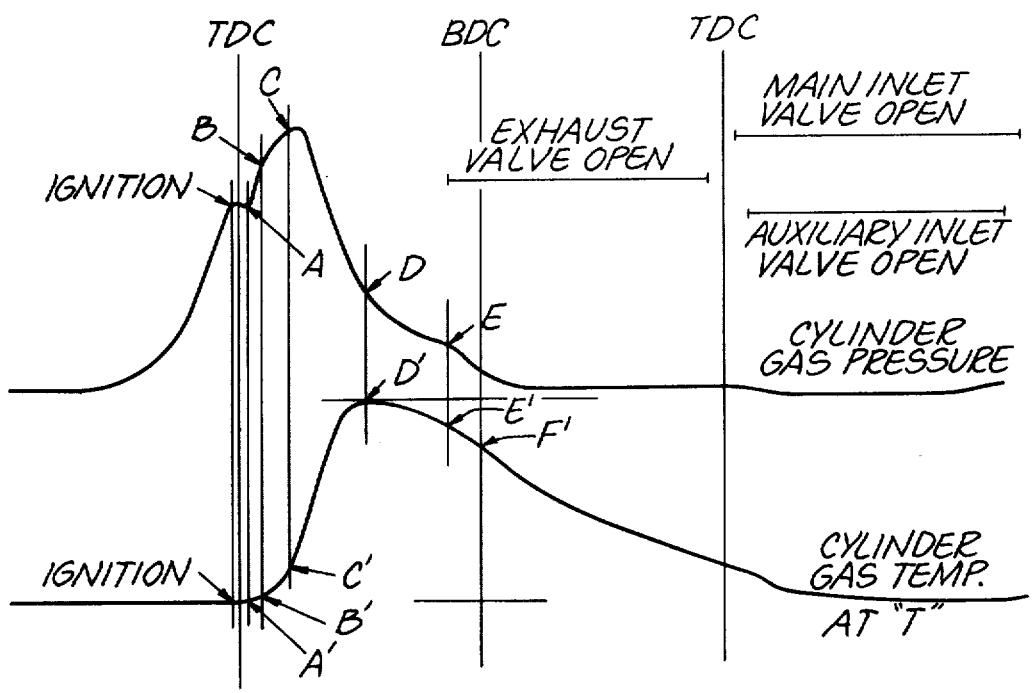
FIG. 8 is a diagram illustrating the sequence of events in the combustion process.
Figure 9:
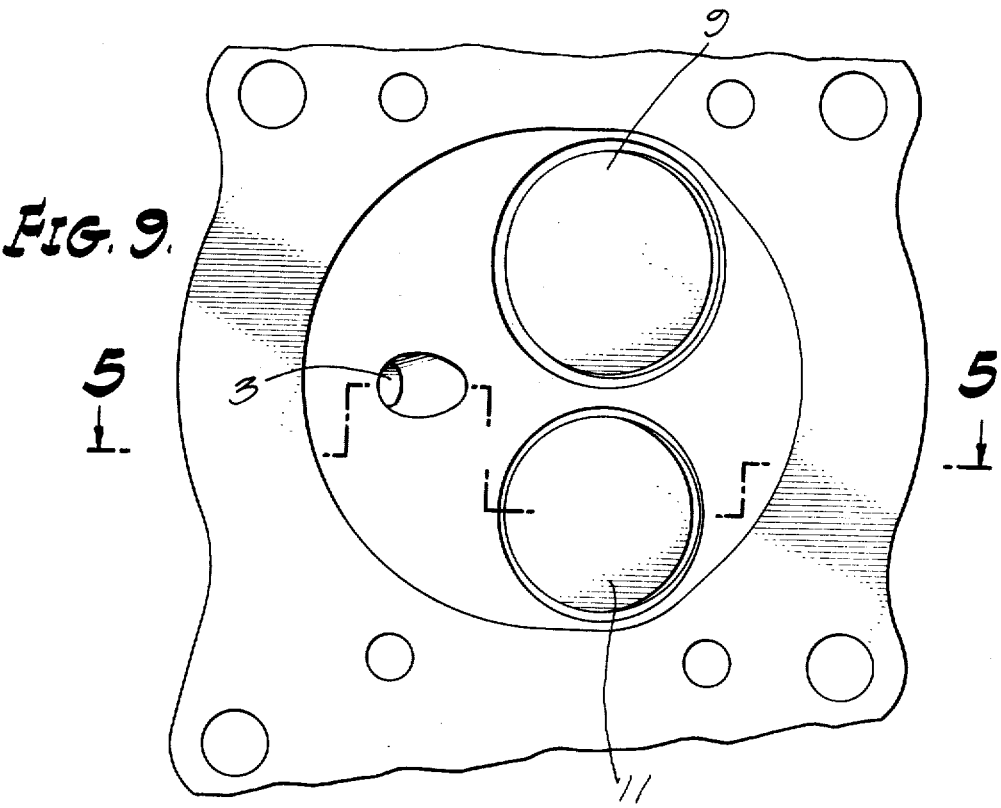
FIG. 9 is a plan view of the under side of the cylinder head above the main combustion chamber, and showing the position of the torch nozzle restriction with respect to the valves for the main combustion chamber.

The chart of FIG. 8 shows details of the combustion process in the operation of the engine embodying this invention. This chart shows the pressure and temperature curves of the combustion gas in the main combustion chamber 2 for each position of the crank angle, when appropriate air-fuel mixtures are supplied to both the main and auxiliary combustion chambers. The temperature values occur at or near point T as shown in FIG. 5. Point A on the pressure curve shows the beginning point of pressure propagation to the main combustion chamber 2, which pressure is generated in the auxiliary chamber 5 after the rich mixture is ignited and burned. This pressure rise continues up to point B.

Point A' on the temperature curve corresponds to point A on the pressure curve. The low temperature level at point A' means that until this point of time the flame front has not reached the main combustion chamber. Point B' on the temperature curve corresponds to point B on the pressure curve, when the gas temperature in the main combustion chamber has been increasing after the flame propagation has taken place to the main combustion chamber from the auxiliary combustion chamber. In other words, the combustion in the auxiliary chamber 5 has been completed at point B or B' and the flame front has spread out into the mixture cloud 64 in the main chamber 2 near the torch nozzle restriction 3. Combustion velocity up to maximum pressure point C is relatively high, resulting in the temperature rise between points B' and C'. After the maximum point C when the piston has begun its downward movement, the pressure also decreases. However, the temperature continues to rise after point C', which means that all of the combustible mixture in the main chamber 2 has not yet completed combustion, and the residual mixture continues to burn at a slow rate during the downward piston stroke.

The big difference in the combustion velocity just before point C as compared to after point C is due to the difference of air-fuel ratio in the combustible mixture in the main combustion chamber 2 near the torch nozzle restriction 3. Combustion in the main chamber 2 continues during the downward stroke of the piston, giving the maximum temperature at point D'. At this point of the piston stroke, the cylinder volume is extremely large, so that the maximum combustion temperature is kept significantly low compared to that of the conventional internal combustion engine in which the maximum temperature is produced no later than 20° to 30° after top dead center. Point D' is about 90° after top dead center.

Point E shows the opening point of the exhaust valve. The corresponding temperature is shown at point E' which is markedly higher than that of a conventional four-cycle internal combustion engine. Also to be noted is the very slow rate of temperature decrease after point D', which means that the residual mixture in the main chamber 2 continues to be burned during the exhaust stroke of the piston.

Figure 6:
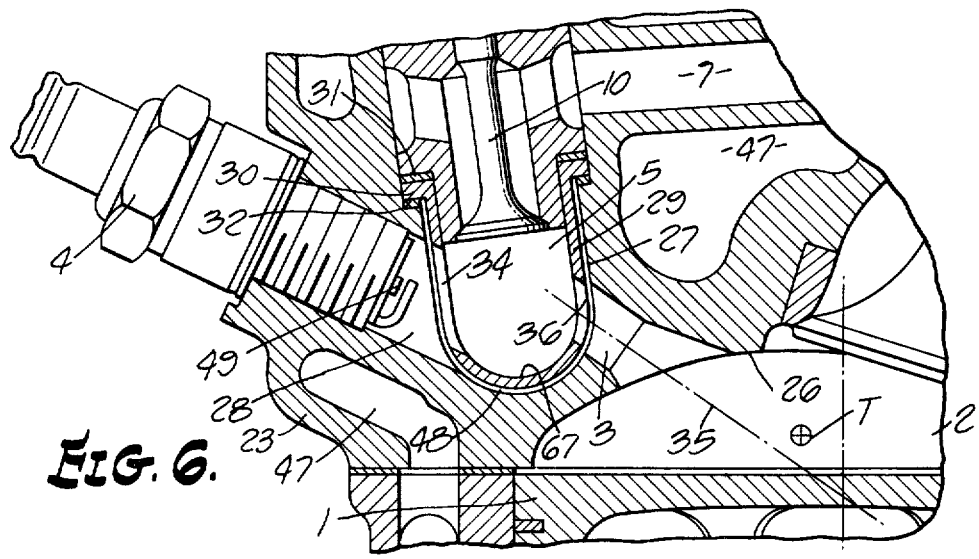
FIG. 6 shows a portion of FIG. 5 on an enlarged scale.

FIG. 8 shows that the cylinder gas temperature at point T (FIG. 6) in the main combustion chamber decreases during the power stroke less than one-half of the amount of the temperature rise to the peak at D'. Thus, the temperature curve at F' (Bottom Dead Center) has fallen from the peak at D' less than one-half of the amount of the rise during the remainder of the power stroke.

The temperature curve shows that a longer time is available for oxidizing hydrocarbons than is possible with the conventional engines, and that the high temperature exhaust gas can effectively be utilized for preheating the inlet mixture and for oxidizing the still unburned hydrocarbons in the exhaust pipe.

Once the relative sizes of the prechamber and main chamber are chosen, and the size of the torch nozzle restriction with respect to the auxiliary chamber is chosen, the factors which determine the size and air-fuel ratio of the mixture cloud are:

$$\frac{\text{weight of air inducted into auxiliary chamber}}{\text{weight of air inducted into main chamber}} = \lambda$$

the air-fuel ratio of the mixture inducted into the auxiliary chamber = $\alpha_a$ the air-fuel ratio of the mixture inducted into the main chamber = $\alpha_m$ If R be assumed to equal the ratio $$\frac{\text{weight of air inducted into auxiliary chamber}}{\text{total weight of air inducted into both chambers}}$$

then $R = \dfrac{\lambda}{1 + \lambda}$

The size of the mixture cloud is largely determined by the ratio $\lambda$ or R and the air-fuel ratio of the mixture cloud immediately before ignition is mainly determined by $\alpha_a$.

Under light load conditions, it is desirable to make the ratio R relatively large in order to reduce HC. In a heavy load condition, it is desirable to make the ratio R small for optimum $NO_x$ control. Furthermore, the $NO_x$ and HC emissions can be minimized by properly selecting the air-fuel ratio of the mixture cloud relative to R in varying load conditions. The air-fuel ratio of the mixture cloud is determined mainly by $\alpha_a$. That is to say, the greater $\alpha_a$, the greater the air-fuel ratio of the mixture cloud; the smaller $\alpha_a$, the smaller the air-fuel ratio. Since $\alpha_m$ is much larger than $\alpha_a$, the effect of $\alpha_m$ on the air-fuel ratio of the mixture cloud is far smaller than that of $\alpha_a$.

Under heavy load conditions, the ratio R is made small in order to minimize the $NO_x$ emissions. When the ratio R is made very small, it is desirable to have a rich air-fuel ratio for the mixture cloud so that the flame propagation into the lean mixture is improved by acceleration, thereby preventing large HC emissions. That is achieved by making $\alpha_a$ small. When the ratio R is made somewhat larger under a heavy load condition, the flame propagation is accelerated excessively. In order to reduce $NO_x$, therefore, it is better to have a lean mixture cloud, namely, large $\alpha_a$. In other words, the ratio R should be smaller under a heavy load condition than in a light load condition. But there is a maximum limit to the ratio $R/\alpha_a$ regardless of the change in the ratio R. In a particular series of tests, it was found that the best emission data were obtained when the ratio $R/\alpha_a$ equals 0.0055–0.016, at the recognized test standard based on a cruising speed of 50 miles per hour. At 50 miles per hour cruising speed of the automobile, referred to hereinafter as the standard test condition, the peak temperature in the main combustion chamber does not exceed about 1,200° C. The peak temperature referred to in the claims is measured under this standard test condition.

When the above considerations are converted in terms of the fuel flow into the auxiliary combustion chamber:

$$Gfa = R \cdot \frac{Gt}{\alpha_a} = R \cdot \eta_v V_{st} \cdot \frac{\gamma_a}{\alpha_a}$$

where
Gfa = weight of fuel admitted to auxiliary chamber
R = weight of air inducted into auxiliary chamber/total weight of air inducted into both chambers
Gt = total weight of air inducted into both chambers
$\alpha_a$ = air-fuel ratio of mixture admitted into auxiliary chamber
$\eta v$ = volumetric efficiency
$\gamma a$ = specific weight of air (a constant)
$V_{st}$ = engine displacement Since $\eta v$ is determined by the load, $$\frac{Gfa}{V_{st}} = K \cdot \frac{R}{\alpha_a} \text{ where } K = \eta_v \cdot \gamma_a = \text{a constant under a given load condition}$$

Under the 50 mph cruising condition, (standard test condition), the best results are obtained when the fuel flow into the prechamber per unit cylinder capacity, per cycle, is:

$3.5 \times 10^{-6} - 5.5 \times 10^{-6}$ grams per cubic centimeter per cycle.

Under light load condition, it is desirable to make the mixture cloud larger than under heavy load conditions, for the purpose of controlling HC emissions. When the ratio R is made sufficiently large, the flame propagation is good, and it is desirable to have a relatively lean mixture cloud from the standpoint of controlling $NO_x$ emissions. Of course, if the mixture is too lean it will not burn. But, since the ratio R is far larger under light load conditions than it is under heavy load conditions, the ratio $R/\alpha_a$ is larger than under a heavy load condition.

When a somewhat smaller ratio R is chosen under a light load condition, it is desirable to make the air-fuel ratio of the mixture cloud small (small $\alpha_a$) to supplement the flame propagation. It has been found that there is an optimum level for the ratio $R/\alpha_a$ under light load conditions, and best results at idling are usually obtained when the ratio $R/\alpha_a$ equals 0.013–0.030.

Nevertheless, the power required for idling varies even among engines of the same displacement according to designs of movable parts and the number and types of accessories that are operated by the engine. That is to say, the combustion temperature during idling varies considerably among different engines. Under idling conditions, therefore, it sometimes becomes more desirable to make the mixture cloud large even at the cost of emitting more $NO_x$, or to make the air-fuel ratio of the cloud small (namely, making the $R/\alpha_n$ large) for the purpose of preventing large HC emissions. When thus controlling HC at the cost of $NO_x$, it is sometimes desirable to make $R/\alpha_n = 0.035$. Taking this into consideration, the range at idling is:

$$\frac{R}{\alpha_n} = 0.013 - 0.035$$

If the carburetor setting is carried out in the manner described above, $\alpha_n$ can be properly chosen between the values of 2 and 6.

As long as the total air-fuel ratio is fixed, the ratio $R/\alpha_n$ is in a constant relationship with the ratio $Gfa/Gft$.

Changes in the type and displacement of engines do not greatly vary the overall air-fuel ratio $\alpha t$ under different load conditions. It is desirable to set the carburetor in such a way that $\alpha t$ is close to the stoichiometric mixture ratio at idling, and leaner than at idling at heavy load when controlling of $NO_x$ is necessary. Therefore, under each load condition, $R/\alpha_n$ can be expressed in terms of $Gfa/Gft$. The desired clean combustion can be attained by setting the auxiliary throttle valve opening in relation to the main throttle valve opening in such a way that optimum $Gfa/Gft$ is obtained under all load conditions. The optimum $Gfa/Gft$ ranges are as follows:

| | |
|---|---|
| Idling | 0.20 – 0.55 |
| 50 mph cruising (standard test condition) | 0.10 – 0.30 |
| Full load | 0.06 – 0.18 |

Figure 10:
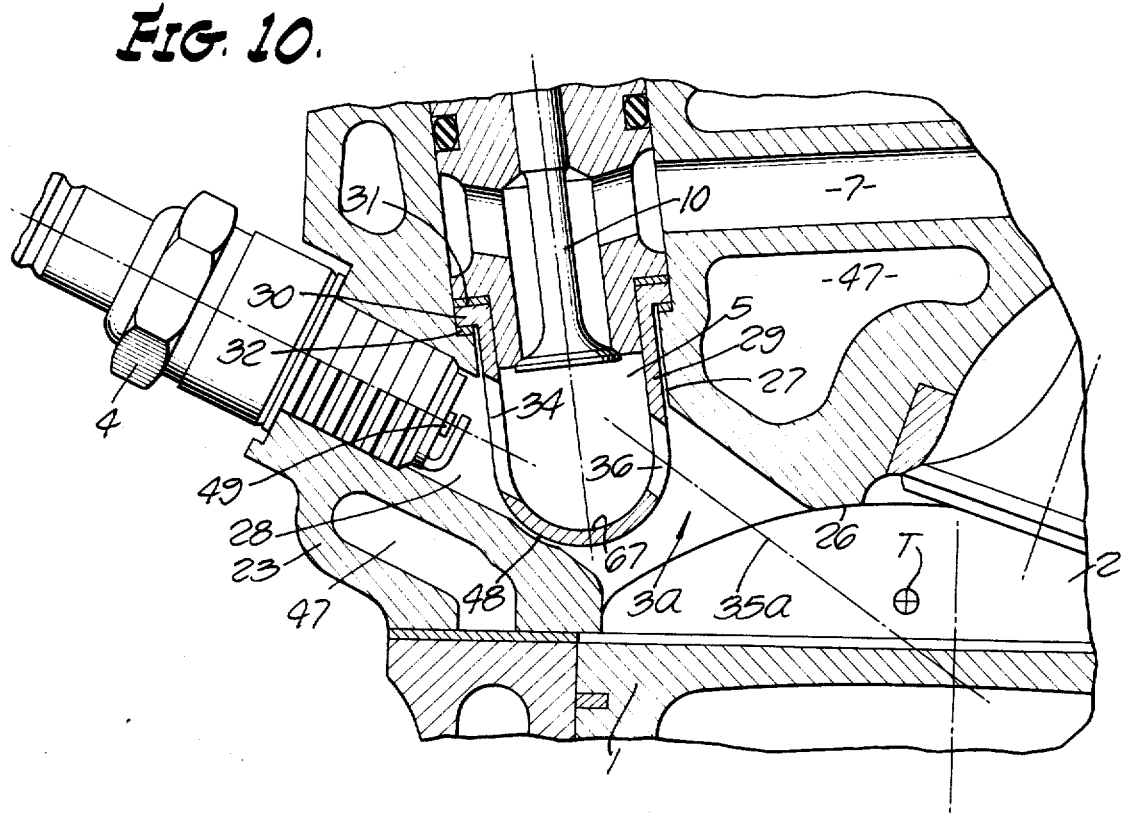
FIG. 10 is a view similar to FIG. 6, showing a modification.

In the modification shown in FIG. 10, the opening $3a$ is enlarged so that a portion of the hot cup 29 is directly exposed to the main combustion chamber 2. The aperture 36 in the wall of the cup becomes the torch nozzle restriction. The axis $35a$ is the axis of the torch flame which extends through the aperture 36. This modified form of the torch nozzle restriction has provided to be superior under cold start-up conditions. In other respects, the modification shown in FIG. 10 has the same construction and mode of operation as described above.

Figure 20:
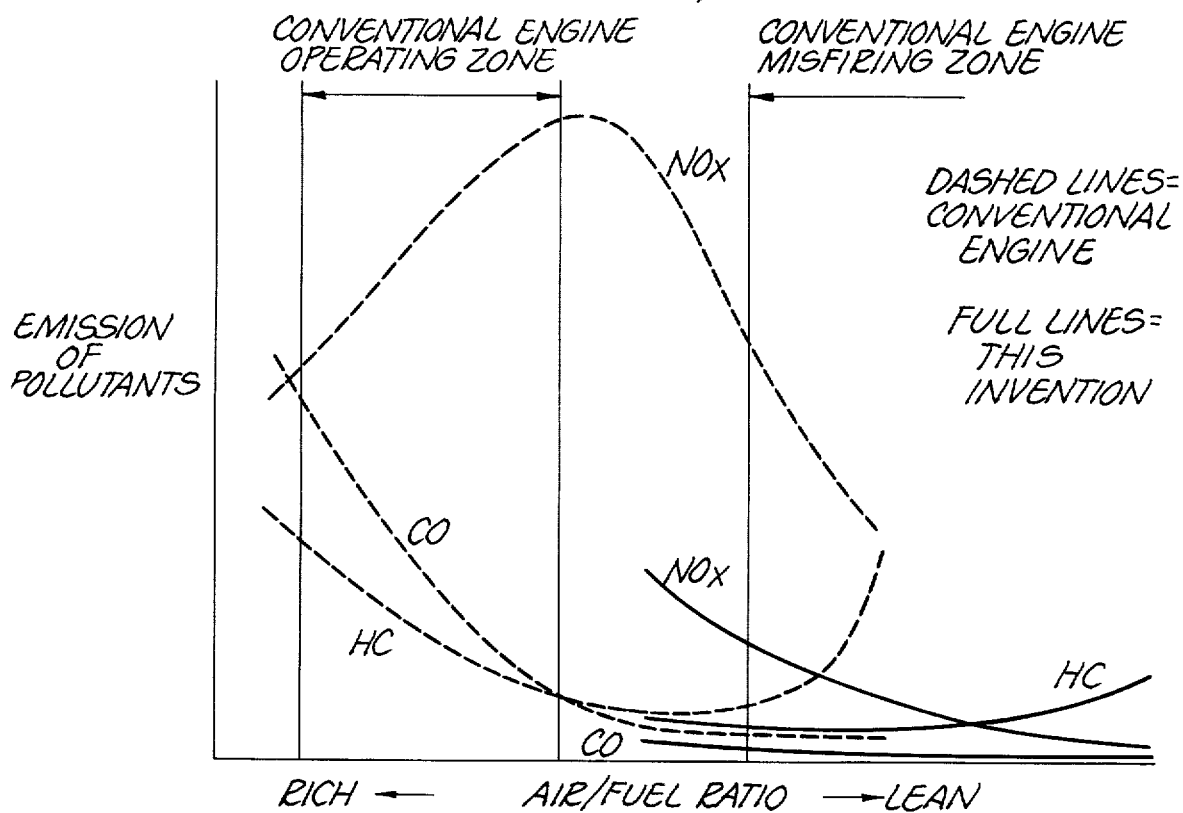
FIG. 20 is a graph showing the relationship of emission characteristics and air-fuel ratio.
Figure 21:
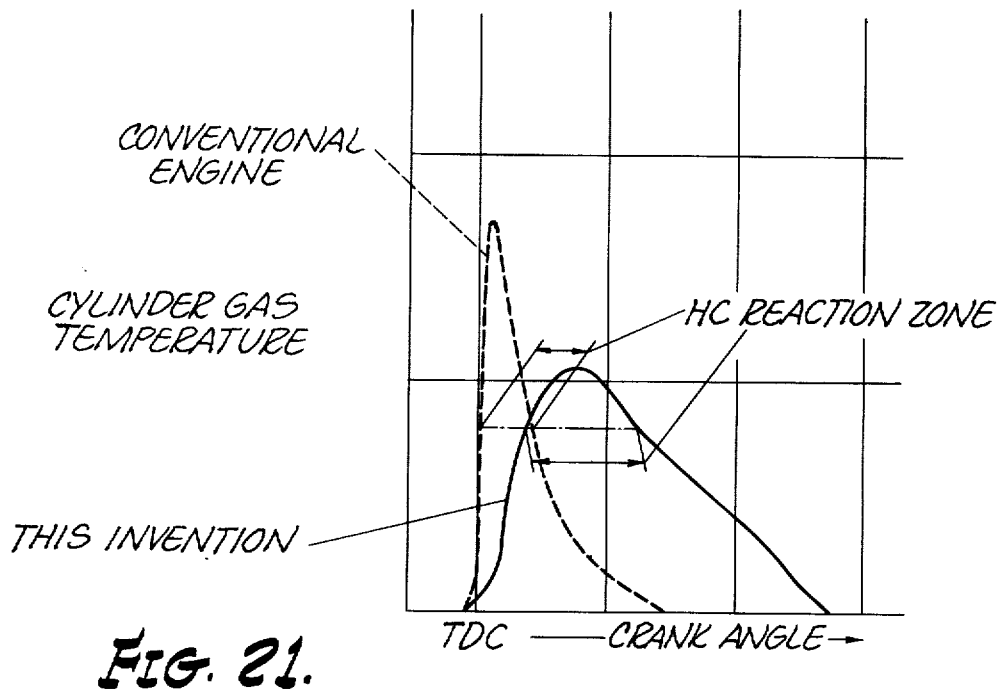
FIG. 21 is a graph showing cylinder gas temperature plotted against crank angle.

The charts shown in FIGS. 20 and 21 compare features of conventional four-cycle spark-ignition internal combustion piston engines with engines embodying the present invention. FIG. 20 compares production of $NO_x$, HC and CO for conventional engines, and engines embodying the present invention. FIG. 21 shows how conventional engines with conventional combustion characteristics produce a high peak cylinder gas temperature, and shows how engines of the present invention produce a much lower peak temperature. Furthermore, the HC reaction zone of the conventional engine is seen to be much shorter in time than the HC reaction zone for engines embodying the present invention.

In a typical engine actually constructed and operated in accordance with this invention, the following dimensional and other data were employed, and temperatures measured:

| | | |
|---|---|---|
| Number of Cylinders | 4 | |
| Bore | 84 | mm |
| Stroke | 88 | mm |
| Total Displacement | 1950.7 | cc |
| Main Chamber Volume ($V_m$) | 62.5 | cc |
| Auxiliary Chamber Volume ($V_a$) | 4.2 | cc |
| Cross Sectional Area of Torch Nozzle Restriction ($F_t$) | 0.503 | $cm^2$ |
| Compression Ratio | 8.3:1 | |
| Maximum Peak Temperature in Main Chamber, Standard Test Condition, About | 1200° | C |
| Maximum Temperature of Exhaust Gases, Full Load | 900° | C |
| Overall Air-Fuel Ratio, Full Load | 18.5 | |
| Overall Air-Fuel Ratio, Idle | 15.5 | |
| Air-Fuel Ratio, Rich Mixture, Both Idle and Full Load ($\alpha_n$) | 3.0 | |
| Air-Fuel Ratio, Lean Mixture, Full Load ($\alpha_m$) | 20.6 | |
| Air-Fuel Ratio, Lean Mixture, Idle ($\alpha_m$) | 23.3 | |

Actual physical tests on automobile engines constructed in accordance with this invention have demonstrated that emissions of $NO_x$, HC, and CO in the exhaust gases are substantially below the maximum levels to be permitted for 1975 by the United States Environmental Protection Agency under the Clean Air Act.

Having fully described our invention, it is to be understood that we are not to be limited to the details herein set forth but that our invention is of the full scope of the appended claims.

We claim:

1. A method for obtaining substantially complete combustion in a four-cycle spark-ignition internal combustion piston engine while minimizing production of unwanted emissions such as $NO_x$, HC and CO in the engine exhaust gases, comprising the steps of: introducing two separate mixtures of air and fuel into a main combustion chamber at separate locations and in a manner to minimize the mixing of the two mixtures during both the suction and compression strokes of the piston, one said mixture being substantially richer in fuel content, said richer mixture being introduced into the main combustion chamber through an auxiliary chamber and torch opening connecting the chambers, controlling the amount of richer mixture introduced into the main combustion chamber to form a smaller volume than the other mixture, simultaneously compressing both mixtures with part of the richer mixture being returned through the torch opening into the auxiliary chamber, maintaining quiescence and minimum turbulence within the main combustion chamber during and at the end of the compression stroke, spark-igniting the compressed mixture in the auxiliary chamber to project a torch flame through the torch opening to ignite the quiescent mixtures in the combustion chamber, the torch opening being placed so that the torch flame axis extends symmetrically from the auxiliary chamber toward the axis of the piston and inclined with respect thereto, the torch flame producing a continuing combustion of the air-fuel mixtures in the main combustion chamber, the resulting temperature rise in the main chamber reaching a peak and then falling from the peak less than one-half of the amount of the rise during the remainder of the power stroke.

2. The method set forth in claim 1 in which the controlling of the amount of the richer air-fuel mixture is accomplished by throttling the air flow for that mixture.

3. The method set forth in claim 1 in which the ratio of the weight of air delivered to the auxiliary chamber to that to the main chamber decreases as the engine load increases.

4. The method set forth in claim 1 in which the ratio of the weight of fuel delivered to the auxiliary chamber to the total weight of fuel delivered to both chambers decreases as the engine load increases.

5. A method for obtaining substantially complete combustion in a four-cycle spark-ignition internal combustion piston engine while minimizing producton of unwanted emissions such as $NO_x$, HC and CO in the engine exhaust gases, comprising the steps of: introducing two separate mixtures of air and fuel into a combustion chamber at separate locations and in a manner to minimize the mixing of the two mixtures during both the suction and compression strokes of the piston, one said mixture being substantially richer in fuel content, said richer mixture being introduced into the combustion chamber through an auxiliary chamber and torch nozzle restriction, controlling the amount of richer mixture introduced into the combustion chamber to form a smaller volume than the other mixture, simultaneously compressing both mixtures with part of the richer mixture being returned through the torch nozzle restriction into the auxiliary chamber, maintaining quiescence and minimum turbulence within the combustion chamber at the end of the compression stroke, spark-igniting the compressed mixture in the auxiliary chamber to project a torch flame through the torch nozzle restriction into the quiescent mixtures in the combustion chamber, the torch flame producing a continuing combustion of the air-fuel mixtures in the combustion chamber throughout the power stroke of the piston, the weight of fuel delivered to the auxiliary chamber as compared to the weight of fuel delivered to both chambers varying for certain engine conditions, as follows:

| | |
|---|---|
| Idling | 0.20 – 0.55 |
| Full Load | 0.06 – 0.18 |

6. The method set forth in claim 1 in which the peak combustion temperature in the main chamber does not exceed about 1,200° C.

7. The method set forth in claim 1 in which the combustion temperature in the main chamber is maintained at not less than about 800° C throughout the power stroke of the piston.

8. The method of operating a four-cycle spark-ignition internal combustion reciprocating piston engine for simultaneously minimizing unwanted emissions of $NO_x$, HC and CO in the engine exhaust gases, comprising the following steps: introducing two separate mixtures of air and fuel into a main combustion chamber at separate locations and in a manner to minimize the mixing of the two mixtures, one of said mixtures being richer than the other, introducing the richer mixture during the suction stroke of the piston through an auxiliary chamber and a torch opening connecting the chambers to form a localized region comprising a mixture of moderate richness within the main chamber near the torch opening, controlling the amount of richer mixture introduced into the combustion chamber to form a smaller volume than the other mixture, causing reverse flow of a portion of said moderate mixture back through the torch opening into the auxiliary chamber during the compression stroke of the piston, the portion of the compressed moderate mixture remaining in the main chamber near the torch opening comprising a mixture cloud having an air-fuel gradient, maintaining quiescence and minimum turbulence within the combustion chamber at the end of the compression stroke, spark-igniting the mixture in the auxiliary chamber to produce a flame extending through the torch opening to burn the mixture cloud and lean mixture, the resulting temperature rise in the main chamber reaching a peak and then falling from the peak less than one-half of the amount of the rise during the remainder of the power stroke.

9. In a four-cycle spark-ignition internal combustion engine for simultaneously minimizing unwanted emissions of $NO_x$, HC and CO in the engine exhaust gases, the combination of: a main combustion chamber having valved intake and exhaust passages, an auxiliary combustion chamber having a valved inlet passage, means forming a torch opening connecting said chambers, the volume of the auxiliary chamber being from 5 to 12% of the total combined volume of the main chamber and the auxiliary chamber, and the cross sectional area of the torch opening being from 0.04 to 0.16 square centimeter for each cubic centimeter of volume of the auxiliary combustion chamber, carburetor means for supplying a lean air-fuel mixture to said valved intake passage, carburetor means for supplying a rich air-fuel mixture to said valved inlet passage, so that during the suction stroke of the piston a lean mixture is drawn into the main chamber and a rich mixture is simultaneously drawn through the auxiliary chamber and torch opening into the main chamber, means for limiting the amount of rich mixture introduced, the shape of the main chamber acting to minimize squish and turbulence at the end of the compression stroke so that a localized region comprising a quiescent mixture of moderate richness is formed in the main chamber near said torch opening, sparking means for igniting the air-fuel mixture in said auxiliary chamber whereby a torch flame is caused to extend through the torch opening to ignite said quiescent mixture, said torch opening being placed so that the torch flame extends symmetrically from the auxiliary chamber toward the axis of the piston and inclined with respect thereto.

10. In an internal combustion engine for simultaneously minimizing unwanted emissions such as $NO_x$, HC and CO in the engine exhaust gases, the combination of: walls including a movable piston forming a main combustion chamber, walls forming a cavity for an auxiliary combustion chamber, the volume of the auxiliary chamber being from 5 to 12% of the total combined volume of the main chamber and the auxiliary chamber, said auxiliary chamber including a thin wall metallic cup of low heat capacity for rapid temperature buildup, said cup being mounted within but spaced from the walls of said cavity, said cup having an aperture providing restricted communication between said chambers, the cross sectional area of said aperture being from 0.04 to 0.16 square centimeter for each cubic centimeter of volume of the auxiliary chamber, a spark plug having electrodes positioned outside said metallic cup, said cup having a second aperture establishing communication between the spark plug electrodes and the interior of the cup, whereby an air-fuel mixture in the auxiliary chamber may be ignited to propel a torch flame through said first aperture, said first aperture being placed so that the torch flame axis extends symmetrically from the auxiliary chamber toward the axis of the piston and inclined with respect thereto.

11. In an internal combustion engine for minimizing unwanted emissions such as $NO_x$, HC and CO in the engine exhaust gases, the engine having valved intake and exhaust passages communicating with a main combustion chamber, and having a valved intake passage communicating with an auxiliary combustion chamber, the chambers communicating through a torch nozzle, and a spark plug positioned to ignite a combustible mixture in the auxiliary chamber, the improvement comprising, in combination: means including a first carburetor for supplying a rich mixture to the valved intake passage communicating with the auxiliary combustion chamber, means including a second carburetor for supplying a lean mixture to the valved intake passage to the main combustion chamber, each carburetor having a venturi passage and a throttle valve, means for operating both throttle valves simultaneously but at different rates, the cross sectional area of the torch nozzle being greater than the cross sectional area of the torch nozzle being greater than the cross sectional area of the venturi passage in said first carburetor, the volume of the auxiliary chamber being from 5 to 12% of the total combined volume of the main chamber and the auxiliary chamber, and the cross sectional area of the torch nozzle being from 0.04 to 0.16 square centimeter for each cubic centimeter of volume of the auxiliary combustion chamber.

12. In a spark-ignition internal combustion engine for minimizing unwanted emissions such as $NO_x$, HC and CO in the engine exhaust gases, the combination of: walls including a movable piston forming a main combustion chamber, walls forming a cavity for an auxiliary combustion chamber, a torch nozzle establishing communication between said chambers, the volume of the auxiliary chamber being from 5 to 12% of the total combined volume of the main chamber and the auxiliary chamber, and the cross sectional area of the torch nozzle being from 0.04 to 0.16 square centimeter for each cubic centimeter of volume of the auxiliary combustion chamber, means including a first carburetor having a venturi throat for supplying a rich mixture to the auxiliary combustion chamber, means including a second carburetor for supplying a lean mixture to the main combustion chamber, the cross sectional area of the torch nozzle being greater than that of the venturi throat of said first carburetor, control means connecting said carburetors for dependent action, a spark plug associated with the auxiliary chamber, and a thin wall heat resistant cup mounted within but spaced from the walls of said cavity, said cup having an aperture forming at least a part of the torch nozzle and having another aperture communicating with the spark plug, means for conducting exhaust gases from said main combustion chamber, and means for heating the rich mixture by heat exchange with the exhaust gases.

13. In a spark-ignition internal combustion engine for minimizing unwanted emissions such as $NO_x$, HC and CO in the engine exhaust gases, the combination of: walls including a movable piston forming a main combustion chamber, walls forming a cavity for an auxiliary combustion chamber, a torch nozzle establishing communication between said chambers, the volume of the auxiliary chamber being from 5 to 12% of the total combined volume of the main chamber and the auxiliary chamber, and the cross sectional area of the torch nozzle being from 0.04 to 0.16 square centimeter for each cubic centimeter of volume of the auxiliary combustion chamber, means including a first carburetor having a venturi throat for supplying a rich mixture to the auxiliary chamber, means including a second carburetor for supplying a lean mixture to the main chamber, the cross sectional area of the torch nozzle being greater than that of the venturi throat of said first carburetor, control means connecting said carburetors for dependent action, a spark plug associated with the auxiliary chamber and provided with electrodes, a thin wall heat resistant cup mounted within but spaced from the walls of said cavity, said cup having a first aperture forming at least a part of the torch nozzle and having a second aperture communicating with the spark plug, the second aperture being out of alignment with respect to the first aperture, and the spark plug electrodes being positioned to avoid direct interception of mixture introduced into the auxiliary chamber.

14. In a spark-ignition internal combustion engine for minimizing unwanted emissions such as $NO_x$, HC and CO in the engine exhaust gases, the combination of: walls including a movable piston forming a main combustion chamber, walls forming a cavity for an auxiliary combustion chamber, a torch nozzle establishing communication between said chambers, the volume of the auxiliary chamber being from 5 to 12% of the total combined volume of the main chamber and the auxiliary chamber, and the cross sectional area of the torch nozzle being from 0.04 to 0.16 square centimeter for each cubic centimeter of volume of the auxiliary chamber, means including a first carburetor having a venturi throat for supplying a rich mixture to the auxiliary combustion chamber, means including a second carburetor for supplying a lean mixture to the main chamber, the cross sectional area of the torch nozzle being greater than that of the venturi throat of said first carburetor, control means connecting said carburetors for dependent action, a spark plug associated with the auxiliary chamber and provided with electrodes, a thin wall heat resistant cup mounted within but spaced from the walls of said cavity, said cup having a first aperture forming at least a part of the torch nozzle and having a second aperture communicating with the spark plug, the second aperture being out of alignment with respect to the first aperture, the spark plug electrodes being positioned to avoid direct interception of mixture introduced into the auxiliary chamber, means for conducting exhaust gases from said main combustion chamber, and means for heating the rich mixture by heat exchange with the exhaust gases.

15. In an internal combustion engine a spark-ignition internal combustion piston engine for simultaneously minimizing unwanted emissions such as $NO_x$, HC and CO in the engine exhaust gases, the engine having valved intake and exhaust passages communicating with a main combustion chamber, and having a valved inlet passage communicating with an auxiliary combustion chamber, the chambers communicating through a torch nozzle restriction, and a spark plug positioned to ignite a combustible mixture in the auxiliary chamber, the improvement comprising, in combination: means including a first carburetor throat for supplying a rich mixture to said valved inlet passage, means including a second carburetor throat for supplying a lean mixture to said valved intake passage, the volume of the auxiliary chamber being from 5 to 12% of the total combined volume of the main chamber and the auxiliary chamber, and the cross sectional area of the torch nozzle being from 0.04 to 0.16 square centimeter for each cubic centimeter of volume of the auxiliary combustion chamber, each carburetor having a throttle valve, means for moving both throttle valves simultaneously, means for coordinating the movement of said throttle valves so that they move at different relative rates between idling and full throttle positions, for varying the quantity of the mixture supplied to each of said chambers, control means for said valved passages so that during the suction stroke of the piston a lean mixture is drawn into the main chamber and a rich mixture is simultaneously drawn through the auxiliary chamber and torch nozzle restriction into the main chamber, the shape of the main chamber acting to minimize turbulence so that a localized region comprising a mixture of moderate richness is formed in the main chamber near the torch nozzle restriction, the spark plug igniting the air-fuel mixture in said auxiliary chamber whereby a torch flame is caused to extend through the torch nozzle restriction to produce slow combustion during the entire power stroke of the piston, with a resulting low peak temperature of combustion.

16. In a spark-ignition internal combustion piston engine for minimizing unwanted emissions such as $NO_x$, HC and CO in the engine exhaust gases, the combination of: valved intake and exhaust passages communicating with a main combustion chamber, a valved intake passage communicating with an auxiliary combustion chamber, the chambers communicating through a torch nozzle, the volume of the auxiliary chamber being from 5 to 12% of the total combined volume of the main chamber and the auxiliary chamber, and the cross sectional area of the torch nozzle being from 0.04 to 0.16 square centimeter for each cubic centimeter of volume of the auxiliary combustion chamber, a spark plug positioned to ignite a mixture in the auxiliary chamber, means including a first conduit for supplying a rich mixture to the valved intake passage to the auxiliary chamber, means including a thin wall metallic conduit for receiving exhaust gases from the valved exhaust passage, and means connecting at least a portion of said conduits in heat exchange relationship so that the mixture in said first conduit is heated by exhaust gases in said thin wall conduit, said means including an enclosing housing of relatively thick walls encompassing said thin wall conduit.

17. In a spark-ignition internal combustion engine for minimizing unwanted emissions in the engine exhaust gases, the combination of: walls including a movable piston forming a main combustion chamber, walls forming a cavity for an auxiliary combustion chamber, the volume of the auxiliary chamber being from 5 to 12% of the total combined volume of the main chamber and the auxiliary chamber, means including a first carburetor having a venturi throat for supplying a rich mixture to the auxiliary combustion chamber, means including a second carburetor for supplying a lean mixture to the main combustion chamber, a thin wall heat resistant cup mounted within and spaced from the walls of said cavity, said cup having an aperture forming a torch nozzle establishing communication between said main chamber and said auxiliary chamber, the cross sectional area of the torch nozzle being from 0.04 to 0.16 square centimeter for each cubic centimeter of volume of the auxiliary combustion chamber, the cross sectional area of the torch nozzle being greater than that of the venturi throat of said first carburetor, and said cup having another aperture communicating with the spark plug.

18. In an internal combustion engine for minimizing the unwanted emissions in the engine exhaust gases, the combination of: walls including a movable piston forming a main combustion chamber, walls forming a cavity for an auxiliary combustion chamber, a thin wall metallic cup of low heat capacity for rapid temperature build-up mounted within the cavity but spaced from the walls thereof, the volume of the auxiliary chamber being from 5 to 12% of the total combined volume of the main chamber and the auxiliary chamber, means including a first aperture in the wall of the metallic cup forming a torch nozzle connecting the main chamber and the auxiliary chamber, the cross sectional area of the torch nozzle being from 0.04 to 0.16 square centimeter for each cubic centimeter of volume of the auxiliary combustion chamber, means including a valve for supplying a rich air-fuel mixture into the interior of said cup, a spark plug having electrodes positioned inside said auxiliary chamber but outside said cup and spaced from the cup wall to avoid direct interception of rich mixture passing said valve into said cup, and said cup having a second aperture establishing communication between said spark plug electrodes and the interior of said cup.

19. The combination set forth in claim 18 in which the cup has a portion exposed to the main chamber and in which said first aperture in the cup wall is the sole means forming the torch nozzle.

20. The combination set forth in claim 18 in which walls are provided forming a recess for reception of at least a portion of the spark plug, the recess intersecting said cavity, said portion of the spark plug filling a major portion of said recess so that the remaining portion which receives the spark plug electrodes is relatively small.

21. The combination set forth in claim 18 including exhaust passage means for conducting exhaust gases from said main combustion chamber and means for passing said rich air-fuel mixture in heat exchange relationship with said exhaust passage means prior to its entry into said cup to promote evaporation of fuel droplets.

22. In an internal combustion engine for minimizing unwanted emissions in the engine exhaust gases, the combination of: walls including a movable piston forming a main combustion chamber, means forming an auxiliary combustion chamber, a torch nozzle restriction establishing communication between said chambers, the volume of the auxiliary chamber being from 5 to 12% of the total combined volume of the main chamber and the auxiliary chamber, and the cross sectional area of the torch nozzle restriction being from 0.04 to 0.16 square centimeter for each cubic centimeter of volume of the auxiliary combustion chamber, means including a valved intake passage for supplying a rich mixture to the auxiliary combustion chamber, means including a second valved intake passage for supplying a lean mixture to the main combustion chamber, ignition means to ignite a mixture in the auxiliary chamber to cause a flame to project through the torch nozzle restriction to burn the lean mixture in the main combustion chamber, and means for controlling the weight of fuel delivered to the auxiliary chamber as compared to the weight of fuel delivered to both chambers, for certain engine conditions, as follows:

| | |
|---|---|
| Idling | 0.20 – 0.55 |
| Full Load | 0.06 – 0.18. |

23. In an internal combustion engine for minimizing unwanted emissions in the engine exhaust gases, the combination of: walls including a movable piston forming a main combustion chamber, means forming an auxiliary combustion chamber, a torch nozzle restriction establishing communication between said chambers, the volume of the auxiliary chamber being from 5 to 12% of the total combined volume of the main chamber and the auxiliary chamber, and the cross sectional area of the torch nozzle restriction being from 0.04 to 0.16 square centimeter for each cubic centimeter of volume of the auxiliary combustion chamber, means including a valved intake passage for supplying a rich mixture to the auxiliary combustion chamber, means including a second valved intake passage for supplying a lean mixture to the main combustion chamber, ignition means to ignite a mixture in the auxiliary chamber to cause a flame to project through the torch nozzle restriction to burn the lean mixture in the main combustion chamber, means forming a valved exhaust passage communicating with the main combustion chamber, means including a thin wall metallic conduit for receiving exhaust gases from said exhaust passage, an enclosing housing of relatively thick walls encompassing said thin wall metallic conduit, and means whereby the rich mixture in the first said intake passage is heated by exhaust gases in said thin wall metallic conduit.

24. In a spark-ignition internal combustion engine for minimizing unwanted emissions in the engine exhaust gases, the combination of: walls including a movable piston forming a main combustion chamber, walls forming an auxiliary combustion chamber, means forming a torch nozzle restriction connecting said chambers, the volume of the auxiliary combustion chamber being from 5 to 12 percent of the total combined volume of the main chamber and the auxiliary chamber, the cross sectional area of the torch nozzle restriction being from 0.04 to 0.16 square centimeter for each cubic centimeter of volume of the auxiliary combustion chamber, means including a venturi throat for supplying a rich mixture to the auxiliary combustion chamber, means for supplying a lean mixture to the main combustion chamber, the cross sectional area of the torch nozzle restriction being greater than that of said venturi throat, ignition means to ignite a mixture in the auxiliary chamber to cause a flame to project through the torch nozzle restriction to burn the lean mixture in the main combustion chamber, means forming a valved exhaust passage communicating with the main combustion chamber, means including a thin wall metallic conduit for receiving exhaust gases from said exhaust passage, an enclosing housing of relatively thick walls encompassing said thin wall metallic conduit, and means whereby the rich mixture for the auxiliary chamber is heated by exhaust gases in said thin wall metallic conduit.

25. In a four-cycle internal combustion engine for simultaneously minimizing unwanted emissions of $NO_x$, HC and CO in the engine exhaust gases, the combination of: a main combustion chamber and an auxiliary combustion chamber connected by a torch opening, one wall of the main chamber being formed by a piston reciprocating in a cylinder, the volume of the auxiliary chamber being from 5 to 12% of the total combined volume of the main chamber and the auxiliary chamber, and the cross sectional area of the torch opening being from 0.04 to 0.16 square centimeter for each cubic centimeter of volume of the auxiliary combustion chamber, means including valve means for supplying a lean air-fuel mixture to the main chamber and a rich air-fuel mixture to the auxiliary chamber so that during the suction stroke of the piston rich mixture is drawn through the torch opening, the size and position of the torch opening causing the rich mixture to diffuse and disperse into the lean mixture to form a localized region of intermediate richness in the main chamber near the torch opening, means for limiting the quantity of the rich mixture supplied, the main chamber having a periphery coincident with the cylinder wall to minimize turbulence in the main chamber at the end of the subsequent compression stroke of the piston and so that an air-fuel mixture gradient remains in the main chamber near the torch opening at that time, sparking means for igniting the compressed mixture in the auxiliary chamber whereby a torch flame is caused to extend through the torch opening into said mixture gradient in the main chamber, said opening being positioned to direct the torch flame symmetrically from the auxiliary chamber toward the cylinder axis and inclined with respect thereto, to cause slow flame front propagation in the lean mixture and prolong combustion throughout the entire power stroke of the piston, and beyond.

26. The combination set forth in claim 25 in which said main combustion chamber has its greatest depth at one side of the centerline of the piston adjacent the torch opening.

27. In a four-cycle internal combustion engine for simultaneously minimizing unwanted emissions of $NO_x$, HC and CO in the engine exhaust gases, the combination of: a main combustion chamber and an auxiliary combustion chamber connected by a torch opening, one wall of the main chamber being formed by a piston reciprocating in a cylinder, the volume of the auxiliary chamber being from 5 to 12% of the total combined volume of the main chamber and the auxiliary chamber, and the cross sectional area of the torch opening being from 0.04 to 0.16 square centimeter for each cubic centimeter of volume of the auxiliary chamber, means including valve means for supplying a lean air-fuel mixture into the main chamber and a rich air-fuel mixture into the auxiliary chamber so that during the suction stroke of the piston, lean mixture is drawn into the main chamber and rich mixture is drawn through the auxiliary chamber through the torch opening into the main chamber, the shape of the torch opening causing the rich mixture to diffuse and disperse into the lean mixture to form a localized region of intermediate richness in the main chamber near the torch opening, means for limiting the quantity of the rich mixture supplied, the main chamber having a periphery coincident with the cylinder wall to minimize turbulence in the main chamber at the end of the subsequent compression stroke of the piston and so that an air-fuel mixture gradient remains in the main chamber near the torch opening at that time, sparking means for igniting the compressed mixture in the auxiliary chamber to project a flame through the torch opening and ignite the mixture gradient in the main chamber, the resulting temperature rise in the main chamber reaching a peak and then falling from the peak less than one-half of the amount of the rise during the remainder of the power stroke.

* * * * *